Jan. 26, 1954 J. M. WRIGHTSON ET AL 2,667,518
MANUFACTURE OF TRIFLUOROCHLOROETHYLENE
Filed Oct. 9, 1948
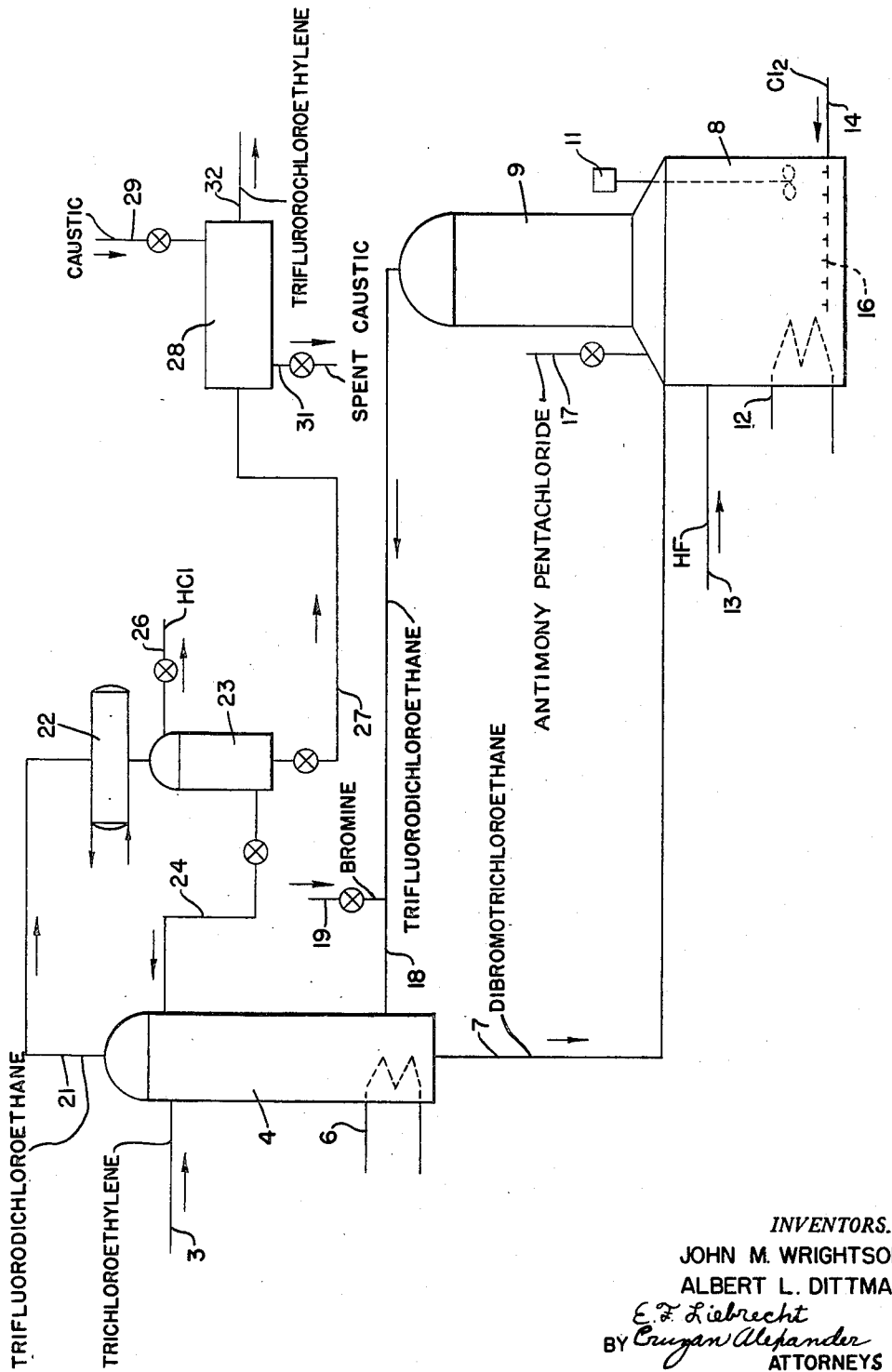
INVENTORS.
JOHN M. WRIGHTSON
ALBERT L. DITTMAN
E. F. Liebrecht
BY Cruzan Alexander
ATTORNEYS Patented Jan. 26, 1954

2,667,518

UNITED STATES PATENT OFFICE 2,667,518

MANUFACTURE OF TRIFLUOROCHLOROETHYLENE

John M. Wrightson, North Bergen, and Albert L. Dittman, Jersey City, N. J., assignors to The M. W. Kellogg Company, Jersey City, N. J., a corporation of Delaware Application October 9, 1948, Serial No. 53,722

7 Claims. (Cl. 260—653)

This invention relates to a method for the manufacture of trifluorochloroethylene. In one aspect, this invention relates to the production of trifluorochloroethylene from trichloroethylene.

Trifluorochloroethylene is a useful intermediate reactant for various chemical processes. In one instance, trifluorochloroethylene is used to produce a solid polymer having desirable chemical and physical characteristics. At present, the solid polymer of trifluorochloroethylene is produced from the monomer prepared by dechlorinating trichlorotrifluoroethane.

The object of this invention is to provide a novel method for preparing the monomer trifluorochloroethylene.

Another object of this invention is to provide an improved method for the production of a perhalocarbon polymer.

Various other objects and advantages of the present invention will become apparent to those skilled in the art from the accompanying description and disclosure.

According to this invention, we have found that the monomer trifluorochloroethylene can be produced from trichloroethylene by the bromination of trichloroethylene to the corresponding bromide, replacing the bromine of the bromide with fluorine, and removing chlorine and hydrogen from the resulting fluorinated compound to produce trifluorochloroethylene.

The following equations illustrate reactions employed in converting trichloroethylene to trifluorochloroethylene:

1. $CHCl=CCl_2+Br_2 \rightarrow CHBrCl-CBrCl_2$
2. $CClHBrCCl_2Br+SbX_5+3HF \rightarrow$
   $SbX_3+2HX+HCl+CHClF-CClF_2+Br_2$
3. $SbX_3+X_2 \rightarrow SbX_5$
4. $CHClF-CClF_2+KOH \rightarrow$
   $CFCl=CF_2+KCl+H_2O$ Equation 1, representing the bromination of trichloroethylene, is carried out at a temperature between about 20 and about 100° C. at atmospheric pressure, at which conditions substantially high yields and selectivity are obtained. Lower or higher temperatures may be used if desired, and superatmospheric pressures may be used without departing from the scope of this invention. Equation 2, representing the replacement of the chlorine in trichlorodibromoethane with fluorine, is effected at a temperature between about 0 and about 300° C., preferably at a temperature between about 60 and about 100° C. for best results, and at a pressure between atmospheric and about 200 pounds per square inch gage, preferably at a pressure between atmospheric and 50 pounds per square inch gage. A stoichiometric excess of antimony pentahalide and hydrogen fluoride is employed in the reaction of Equation 2. The reaction of Equation 3 may be carried out simultaneously or in a separate vessel from the reaction of Equation 2 and under the same conditions. Equation 4, involving the removal of hydrogen and chlorine from trifluorodichloroethane, is effected under liquid phase conditions at slightly elevated temperatures (25–50° C.). The temperature and pressure conditions are chosen in relation to each other to provide liquid or vapor phase conditions for the reactions.

The success in producing trifluorochloroethylene from trichloroethylene by the above method is to a large extent accounted for by the use of bromine in the reaction of Equation 1. It has been found that the use of chlorine in Equation 1 results in the production of a trifluoride by the reaction of Equation 2, which type of trifluoride cannot be dehydrochlorinated to produce trifluorochloroethylene. The influence of bromine and its comparison to the product produced by chlorine is shown by the following equations:

With Chlorine:

5. $CHCl=CCl_2+Cl_2 \rightarrow CHCl_2CCl_3$
6. $CHCl_2-CCl_3+SbF_3Cl_2 \rightarrow$
   $CHCL_2-CF_3+SbF_2Cl_3$ With Bromine:

7. $CHCl=CCl_2+Br_2 \rightarrow CHClBr-CBrCl_2$
8. $CHClBr-CBrCl_2+SbF_3Cl_2 \rightarrow$
   $CHClF-CClF_2+SbF(3-x)Cl_x+Br_2$ In the reaction of Equation 2 above for the fluorination of dibromotrichloroethane, antimony pentachloride is the preferred fluorinating agent, although other antimony salts containing fluorine and chlorine may be used, such as $SbF_3Cl_2$.

The process of this invention may be carried out in either a batchwise or continuous manner. The accompanying drawing diagrammatically illustrates an arrangement of apparatus in elevation for the continuous preparation of trifluorochloroethylene from trichloroethylene. The manner of operation and the specific reactants cited with regard to the drawing are illustrative and should not be construed as unnecessarily limiting to the present invention.

According to the drawing, liquid trichloroethylene is continuously passed through conduit 3 to the upper portion of a packed tower 4 in which the trichloroethylene countercurrently contacts an upward flowing vaporous stream containing bromine. The trichloroethylene feed may conveniently be prepared from ethane by the chlorination of ethane to produce tetrachloroethane and the subsequent removal of hydrogen and chlorine with caustic to produce trichloroethylene. Trichloroethylene reacts with bromine to produce dibromotrichloroethane in tower 4, and this product collects as a liquid in the lower portion of column 4. The liquid at the bottom of the column is maintained at the desired temperature, usually at the boiling point of the solution by means of a conventional heating coil 6.

Liquid containing dibromotrichloroethane is removed from the bottom of tower 4 through conduit 7 and is continuously passed to a fluorination zone 8. In fluorination zone 8, the dibromide is maintained as a liquid in the lower portion thereof by imposing suitable pressure on the reaction zone. Reaction zone 8 comprises a dephlegmator 9 and contains a stirrer 11 for agitating the reactants in the lower portion of the reaction zone. A conventional heating or cooling coil 12 is positioned in the liquid in the lower portion of reaction zone 8 to maintain the desired temperature conditions of between about 0 and about 300° C., preferably between about 60 and about 100° C. for best results. Liquid hydrogen fluoride is continuously introduced into reactor 8 through conduit 13. Antimony pentachloride is introduced into reactor 8 through conduit 17 at the start of the process in an amount in substantial excess of that required for maintaining the desired rate of reaction. The antimony pentachloride and the hydrogen fluoride react with the dibromide to produce trifluorodichloroethane, thereby liberating hydrogen chloride and bromine. Antimony pentachloride is reduced to the trichloride by the reaction. In order to regenerate or reoxidize the antimony chloride, chlorine is introduced into the lower portion of reactor 8 through conduit 14 and a conventional distribution means 16. Chlorine may be intermittently or continuously introduced into reactor 8 through conduit 14, as desired.

In a modification of this invention, the reoxidation of the reduced antimony chloride may be effected in a reaction zone separate from reactor 8. According to such modification, the spent or reduced antimony chloride is removed by means of a conventional star valve from the lower portion of reactor 8 where it settles as a solid. The solid antimony trichloride is transferred to a separate reaction zone (not shown) in which it is contacted with chlorine to convert the trichloride to the pentachloride. The resulting antimony pentachloride is then circulated back to reactor 8, such as through conduit 17.

Under the conditions of operation of reactor 8, the product trifluorodichloroethane is vaporized and passes upward through dephlegmator 9 in which entrained dibromide and hydrogen fluoride are removed. The effluent from reactor 8 comprising the aforesaid product, bromine and hydrogen chloride is continuously passed through conduit 18 to the lower portion of tower 4. The bromine thus formed in reactor 8 brominates the trichloroethylene as previously described and circulates within the process requiring no addition of bromine, except that necessary to start the process, which bromine may be added through conduit 19.

Since the lower portion of tower 4 is maintained substantially at the boiling point of the solution, hydrogen chloride and trifluorodichloroethane pass as vapors upwardly therethrough. This vaporous effluent is continuously removed from tower 4 through conduit 21 and is passed through a condenser which cools the effluent to a temperature slightly below the dew point of trifluorodichloroethane. Condensate and uncondensed gases pass from condenser 22 to an accumulator 23. A portion of the condensate in accumulator 23 is circulated to the upper portion of packed column 4 as a liquid reflux therefor. The temperature of this liquid reflux is about 28° C. for atmospheric pressure operations. Hydrogen chloride and any other gaseous components of the process are removed from accumulator 23 through conduit 26. The hydrogen chloride thus obtained may be converted to chlorine by the conventional Deacon process and the chlorine reintroduced into the process through conduit 14, if desired.

Condensate comprising trifluorodichloroethane is removed from accumulator 23 through conduit 27 and is continuously passed to a caustic treating unit 28. An aqueous caustic solution of sodium, potassium, or calcium hydroxide is introduced into unit 28 through conduit 29. The caustic dehydrochlorinates trifluorodichloroethane to produce trifluorochloroethylene. Spent caustic solution is removed from caustic treating unit 28 through conduit 31. Trifluorochloroethylene is removed from unit 28 through conduit 32. The separation of the caustic solution from trifluorochloroethylene is effectively and easily accomplished by maintaining such conditions that the trifluorochloroethylene is in the vaporous state. The trifluorochloroethylene thus recovered is substantially pure and may be used directly as a monomer for producing various polymers thereof.

The trifluorochloroethylene product of this invention may be converted to a solid polymer of good chemical and physical characteristics by polymerizing the monomer at a temperature of about —16° C. in the presence of bis-trichloroacetyl peroxide. The monomer may also be converted to oils by using different polymerizing agents and different conditions of temperature and pressure.

Although the invention has been described with reference to a specific continuous flow process and the use of specific types of apparatus, various modifications and alterations will become apparent to those skilled in the art. Various condensers, valves, separating and mixing zones, etc. have been omitted from the drawing as a matter of convenience and clarity. Although tower 4, for example, was described as a packed column, this tower may include baffle plates and bubble trays, rather than packing without departing from the scope of this invention.

Having described our invention, we claim:

1. A process for the manufacture of trifluorochloroethylene from trichloroethylene which comprises reacting trichloroethylene with bromine at a temperature between about 20° C. and about 100° C. to produce the corresponding dibromide addition product, reacting the resulting dibromide with hydrogen fluoride at a temperature between about 0° C. and about 300° C. and at a pressure between about atmospheric and about 200 pounds per square inch gage in the presence of an antimony salt containing chlorine to produce trifluorodichloroethane, and subsequently dehydrochlorinating the trifluorodichloroethane to produce trifluorochloroethylene as the product of the process.

2. A process for the manufacture of trifluorochloroethylene from trichloroethylene which comprises reacting trichloroethylene and hydrogen fluoride in the presence of bromine and an antimony salt containing chlorine to produce trifluorodichloroethane and subsequently dehydrochlorinating the aforesaid product to produce trifluorochloroethylene as a product of the process.

3. A process for the production of trifluorochloroethylene from trichloroethylene which comprises reacting trichloroethylene with bromine at a temperature between about 20 and about 100° C. to produce the corresponding dibromide addition product, reacting the dibromide thus produced with hydrogen fluoride and an antimony halide salt containing chlorine at a temperature between about 0 and about 300° C. and at a pressure between about atmospheric and about 200 pounds per square inch gage to produce trifluorodichloroethane and to reduce the antimony salt, reoxidizing the reduced antimony salt with chlorine for reuse, and dehydrochlorinating the trifluorodichloroethane with a caustic solution to produce trifluorochloroethylene as a product of the process.

4. A continuous process for the production of trifluorochloroethylene from trichloroethylene which comprises introducing trichloroethylene into the upper portion of a fractionation column, passing a gas comprising bromine upward through said fractionation column under conditions such that trichloroethylene is brominated to the corresponding dibromide addition product, withdrawing from the lower portion of said fractionation column a liquid comprising trichlorodibromoethane and passing same to a reaction zone, reacting trichlorodibromoethane with hydrogen fluoride and in the presence of a pentavalent antimony halide salt containing chlorine under conditions such that hydrogen chloride, bromine and trifluorodichloroethane are produced and the antimony salt is reduced, oxidizing the reduced antimony salt with chlorine for reuse by introducing chlorine into said reaction zone, withdrawing a gaseous effluent comprising hydrogen chloride, bromine and trifluorodichloroethane vapors from said reaction zone and introducing same into the lower portion of said fractionation column, withdrawing an effluent comprising trifluorodichloroethane and hydrogen chloride from the upper portion of said fractionation column, separating hydrogen chloride from trifluorodichloroethane in said latter effluent, treating the thus separated trifluorodichloroethane with a caustic solution of potassium hydroxide to produce trifluorochloroethylene as the product of the process.

5. A continuous process for the production of trifluorochloroethylene from trichloroethylene which comprises introducing trichloroethylene into the upper portion of a fractionation column, passing a gas comprising bromine upward through said fractionation column under conditions such that trichloroethylene is brominated to the corresponding dibromide addition product, withdrawing from the lower portion of said fractionation column a liquid comprising trichlorodibromoethane and passing same to a reaction zone, reacting trichlorodibromoethane with hydrogen fluoride and in the presence of a pentavalent antimony halide salt containing chlorine under conditions such that hydrogen chloride, bromine and trifluorodichloroethane are produced and the antimony salt is reduced, withdrawing an effluent comprising hydrogen chloride, bromine and trifluorodichloroethane from said reaction zone and introducing same into the lower portion of said fractionation column, withdrawing an effluent comprising trifluorodichloroethane from the upper portion of said fractionation column, treating the trifluorodichloroethane with a caustic solution to produce trifluorochloroethylene as the product of the process.

6. A continuous process for the production of trifluorochloroethylene from trichloroethylene which comprises introducing trichloroethylene into the upper portion of a fractionation column, passing a gas comprising bromine upward through said fractionation column under conditions such that trichloroethylene is brominated to the corresponding dibromide addition product, withdrawing from the lower portion of said fractionation column a liquid comprising trichlorodibromoethane and passing same to a reaction zone, reacting trichlorodibromoethane with hydrogen fluoride in the presence of an antimony halide salt under conditions such that bromine and trifluorodichloroethane are produced, withdrawing an effluent comprising bromine and trifluorodichloroethane from said reaction zone and introducing same into said fractionation column, withdrawing an effluent comprising trifluorodichloroethane from said fractionation column, treating the trifluorodichloroethane with a caustic solution to produce trifluorochloroethylene as the product of the process.

7. A process for the manufacture of trifluorochloroethylene from trichloroethylene which comprises brominating trichloroethylene at a temperature between about 20° C. and about 100° C. to produce the corresponding dibromide, fluorinating the resulting dibromide with hydrogen fluoride in the presence of an antimony salt selected from the group consisting of antimony pentachloride and antimony dichlorotrifluoride at a temperature between about 0° C. and about 300° C. and at a pressure between about atmospheric and about 200 pounds per square inch gage to produce trifluorodichloroethane, and dehydrochlorinating the trifluorodichloroethane thus produced, to produce trifluorochloroethylene as the product of the process.

JOHN M. WRIGHTSON.
ALBERT L. DITTMAN.

References Cited in the file of this patent

UNITED STATES PATENTS

| Number | Name | Date |
|---|---|---|
| 2,344,061 | Renoll | Mar. 14, 1944 |
| 2,377,297 | Lamb et al. | May 29, 1945 |
| 2,493,007 | McBee et al. | Jan. 3, 1950 |
| 2,493,008 | McBee et al. | Jan. 3, 1950 |
| 2,510,872 | Downing | June 6, 1950 |

OTHER REFERENCES

Herz, Ber. Deut. Chem., vol. 46, pages 2588–90 (1913).

Henne et al., "Jour. Am. Chem. Soc.," vol. 58, pages 402-3 (1936).

Kharasch et al., J. Org. Chem., vol. 3, pages 48-54 (1938).